United States Patent Office 3,519,910
Patented July 7, 1970

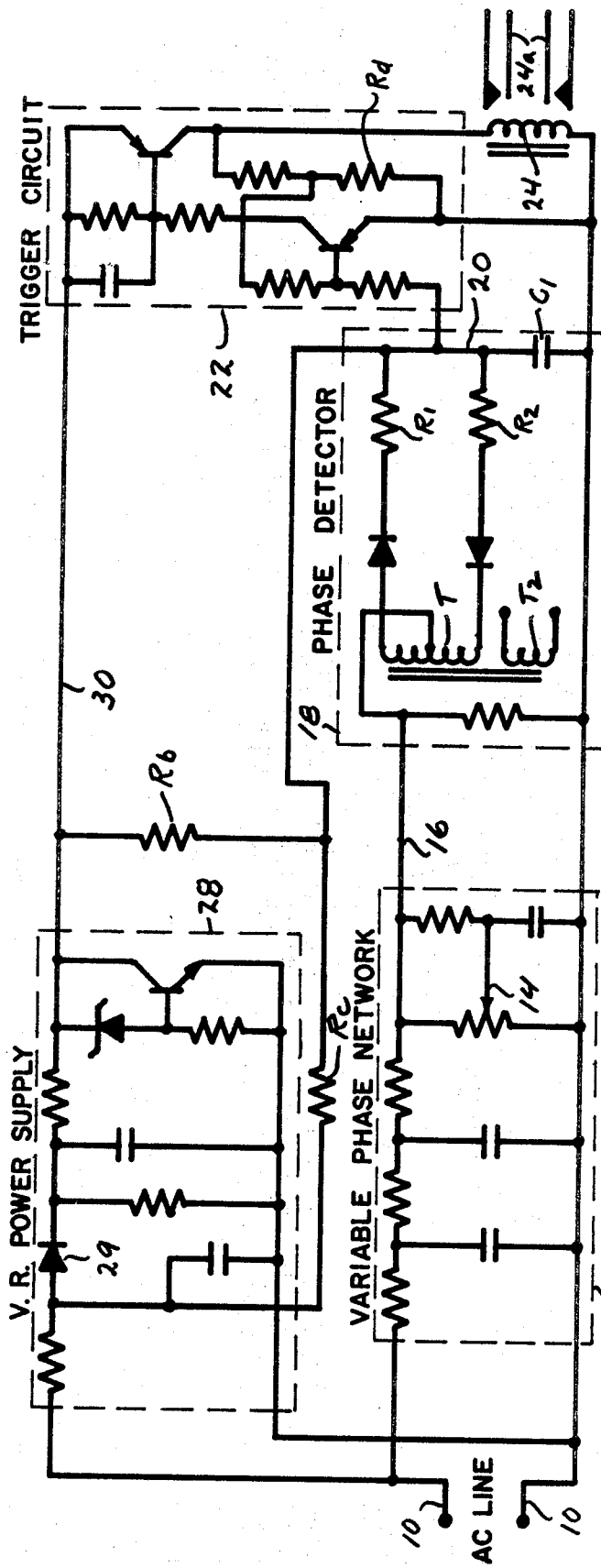
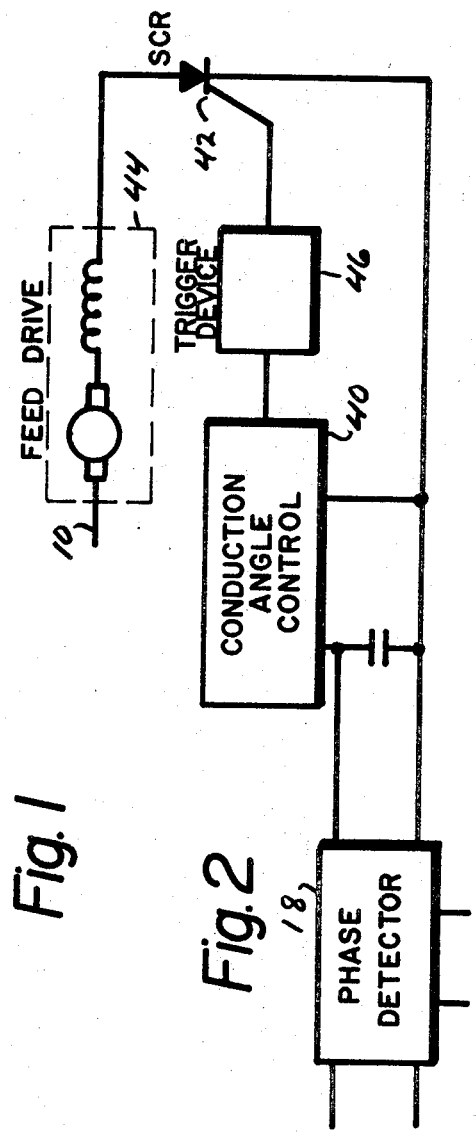
Fig. 1
Fig. 2
INVENTORS.
Ernest H. Pfaff
Thomas F. Mills Jr.
BY *J. D. Douglass*
 *their atty*

3,519,910
METHOD AND APPARATUS FOR ELECTRONIC SENSING OF MOTOR TORQUE
Ernest H. Pfaff, Deerfield, and Thomas F. Mills, Jr., Chicago, Ill., assignors to Jeanne Pfaff, Deerfield, Ill.
Filed Apr. 11, 1968, Ser. No. 720,554
Int. Cl. H02p 5/42
U.S. Cl. 318—218                9 Claims

ABSTRACT OF THE DISCLOSURE

A discriminator circuit is used which receives an A.C. voltage signal from the line the phase of which may be adjusted. It also receives an A.C. signal derived from the current in a motor the phase of which is determined by the load on the motor. The phase of the line signal is so adjusted that there is a desired relationship between the line signal and the motor signal. These signals are then combined in a detector circuit the output of which is determined by the phase relationship and used to control a motor. The control may disconnect the motor or be used to control the speed of the motor.

---

This invention relates to a method and apparatus for sensing the torque of an induction motor and utilizing the sensing means to control the motor or another device. There are many places in the industry where it is desirable to discontinue power to a motor when the load attains a certain value. This may be to protect the motor against burn-out or to interrupt the power when the work being driven achieves a certain state. The last means includes but is not limited to the discontinuance of power to a motor which is driving the mixing or stirring elements of a device such as an ice cream freezer. In this instance it is desirable to discontinue the stirring operation when the mixture reaches a certain consistency. It may also be used to control other devices such as feed motors which operate in conjunction with a process motor.

Although heretofore mechanical torque releasing means have been proposed and used, there have been certain inherent disadvantages thereto such as the fact that they are often difficult to install in existing machines because of space limitations. They were difficult to adjust to operate at an exact amount of torque. Further, torque means for one size of motor could not be used for larger or smaller motors, making it necessary to stock many different sizes of torque controlled means. Magnetic and current operated means have also been proposed but have undesirable features, such as expensive relays and multiple switching means which are subject to deterioration, bulky and difficult to adjust and install and were also critical as to motor size.

By the present invention a torque operated means which requires no mechanical connection between motor and the machine being driven, is possible. It may be installed by a few simple electrical connections and disposed in any convenient location taking up a minimum of space. It is also economical to manufacture and requires standard electrical components which are readily available on the market. It can be used to control a switch which will turn a motor on and off with an extremely small differential at a precise amount of mechanical load and with a minimum of influence by "wow" of motor and line voltage changes. A further advantage resides in the fact that the parts may be of a modular construction and the separate components or an entire device potted in a suitable material, making it difficult, if not impossible, for unauthorized persons to tamper with it, and, furnishing protection against deleterious elements. One device may also be used with motors of vastly different capacity.

Still other advantages of the invention and the invention itself will become more apparent from the following description of an embodiment thereof which is illustrated by the accompanying drawings and forms a part of this specification.

In the drawings:

FIG. 1 is a schematic diagram of a circuit which may be used to carry out the invention used in conjunction with means for opening a motor circuit; and FIG. 2 is a diagrammatic view showing the invention as applied to a system where a feed motor is used in conjunction with a process motor.

The invention will first be described in conjunction with its use for controlling a motor by shutting off the motor when a certain amount of torque is present. It will be apparent that there are other uses to which it may be put which embody the basic functions and that the invention is not limited to the specific application or applications cited.

It is known that as a motor is loaded the current increases but this increase is not of considerable consequence. There is one thing, however, that does change with change in load and that is the phase angle between the current and line voltage. With an increase in load the angles come more nearly into phase. Thus, the actual change in phase angle may be considered as relatively greater than the current change and the power factor is a much closer analog of the load than anything else. This points out that current operated devices have inherently less sensitivity than could be desired. Therefore, in this invention utilization is made of the change in phase angle which is greater per unit load and thus enables a more accurate degree of control, based on load, to be obtained. Of particular interest is the fact that on loads considerably less than full load the system has even greater sensitivity.

Advantage is taken of the change in phase angle to perform the operation. Briefly, a voltage wave is taken from the line and passed through a controllable phase shift network to a transformer in a detector or discriminator circuit. A winding on the transformer is inserted in the motor line and obtains a current signal, the phase angle of which depends upon the load, which is injected into the transformer.

One manner of operation is to adjust the phase shift circuit until the point is reached where as long as the motor is operating under the critical load there is a D.C. output from the detector circuit because of the phase difference. As the load on the motor approaches the value at which it is to be cut off, the change in phase angle from the signal from the motor is such that the D.C. voltage is reduced at the detector output.

It will be apparent that at the output of the detector various conditions can be realized. A positive voltage could be present under one condition. No voltage under another condition and a negative voltage under a third phase angle. Therefore, the output from the detector can be used to control the speed of a motor to step up the speed if it is too low; maintain the speed at a desired speed or, cut down the speed if it is too high. In other words, it can be used to control the speed of a piece of apparatus the same as a governor, but with none of the inherent mechanical defects thereof.

One particularly desirable application is for controlling the refrigeration of an ice cream making machine. In this operation the mix it placed in the machine and the beater started. The phase shift circuit is initially adjusted so that there is an output at the discriminator circuit which closes the refrigeration control circuit at the end of the beater starting surge. When the shift in phase of the beater motor, due to increase in load, is such as to bring the two signals in the detector circuit into phase, the refrigeration opening circuit is operated, which is set to occur when the mix reaches the desired consistency, shutting off the refrigeration. With this type of operation a failure in the control circuit would result in a "fail safe" operation.

It is apparent that a single device can be used to effect the desired operation on various horsepower motor circuits without being effected by the size of the motor or the current drain other than as the drain causes the desired phase shift. It is also apparent that amplification could be added to the circuit shown to make it even more sensitive when desired.

More specifically as shown in the drawing, the voltage from the line 10 is applied to the input of the phase changer network 12, the phase of which may be shifted by moving the slider 14. This network is well known in the art and others may be substituted if desired, the only requirement being that it have the desired change of adjustment.

The output from this network is fed by the line 16 to the center tap of a discriminator transformer T in the discriminator circuit 18. The discriminator circuit can be relatively simple and of conventional design consisting of the transformer T, the ends of the main winding being connected to diodes poled in opposite directions and with a filtering and signal combining network consisting of the two balanced resistors $R_1$ and $R_2$ which are connected by line 20 to condenser $C_1$.

An independent winding $T_2$, which is associated with the core of the transformer, has terminals which are inserted in series with one of the power lines to the motor and picks up an A.C. current wave signal which is induced into the main winding and is there present along with the phase controlled voltage signal from the line 10.

The motor control circuit 22 may take various forms. In this particular instance it is shown as a conventional transistorized Schmitt trigger circuit which has in its output a relay coil 24 which when energized causes a set of contacts 24a to be closed. It is pointed out that the circuit could be arranged to hold the contacts open or closed depending upon the particular type of control desired.

Power for the trigger circuit is obtained from a transistorized regulated voltage supply 28 which obtains its power from the line 10 and supplies power to the trigger circuit through the line 30.

Although in the interest of simplicity a single phase circuit is shown, multiple phase circuits could be used as would be apparent to those versed in the art. The resistor $R_d$ in the trigger circuit may be variable to control the differential at which the trigger circuit operates.

A refinement of the invention consists in means to compensate for line voltage fluctuations. Should the line voltage increase, due to a reduction in line load, there would be an increase in terminal voltage to the motor; the result is a retardation of the motor current phase angle. This could result in a requirement for a heavier trip load than at normal line voltage because it has the ultimate effect of a decrease in load.

Means is provided to introduce into the phase detector output a D.C. voltage, derived from the rectified line voltage, which exactly opposes that component of the detector output which results from the line voltage induced retardation in the motor current phase angle.

Assuming that the phase detector 18 is so arranged that a retardation in the motor current phase angle produces a positive directed output. A negative directed D.C. voltage is introduced into the detector from the negative side of the line rectifier 29 through the resistance $R_c$ connected to the line 20. The standing part of this voltage is balanced out by positive voltage obtained from the positive side of the power supply through the resistor $R_b$ also connected to the line 20.

Thus line voltage induced changes in the motor current phase angle and thence the detector output is balanced out through $R_c$.

As was previously mentioned, the basic circuit has many uses where torque is the controlling factor. For instance, the torque load on a process drive motor is a direct function of the rate of feed and the nature of the material being processed. A control means may be provided which varies the rate of feed of material in accordance with the torque load. Such a system would be useful in a process where the material has a varying physical state such as consistency, viscosity, hardness, density, quality etc. In such a system it is desirable to provide a feed rate which will automatically vary with the ease or difficulty in processing the material e.g. speed the process up for soft material or slow it down for hard material. This would provide a constant work output from the process without excessive light running or overload of the process drive motor.

Such a device is illustrated diagrammatically in FIG. 2, wherein the process motor torque analog output from the power factor torque sensing means 18 is connected to a conduction angle control 40 to vary the conduction angle of an SCR 42 in series with the feed drive motor 44 which receives its power from the line 10. A trigger device 46 is disposed between the conduction angle control and the SCR 42.

The circuitry is so arranged as to increase the conduction angle under light torque loads and reduce the conduction under high torque loads. Thus a reduction in process motor torque, when working softer or smaller quantities of material, will result in a longer conduction angle of the feed motor control SCR 42 which will speed up the feed motor and feed the material faster. Obviously the SCR could be replaced by a triac. A harder or more dense material will cause a higher torque load on the process drive motor and this will cause the SCR to operate at a smaller conduction angle and slow down the feed drive motor.

Having thus described the invention in some embodiments thereof we are aware that numerous and extensive departures may be made from the specific disclosure without departing from the spirit or scope of the invention as defined by the appended claims.

We claim:

1. In combination with an A.C. line and an induction motor connected thereto, means for interrupting the connection to the motor comprising means for obtaining an A.C. voltage signal from the line and for controlling the phase thereof, means for obtaining an A.C. current signal from the motor, detector means connected to said phase control means and to said current signal means arranged to provide a direct current output voltage depending upon the phase angle relationship of said two signals, and means operated by said detector means connected to the motor circuit to open the motor circuit in the presence of a voltage of the desired value.

2. An apparatus as described in claim 1 wherein means is provided to compensate for apparent changes in current phase angle due to variations in line voltages including means to rectify the line voltage connected to the line and means connecting said rectifier to said detector to introduce into said detector a D.C. voltage to oppose the component of detector output resulting from the change in phase angle of current signal due to increase in line voltage.

3. In combination with a machine driven by an electric induction motor having an A.C. energizing circuit, driving force limiting means for protecting the machine against overload comprising a current winding disposed in the motor circuit, a transformer, said current winding being a part of the transformer and furnishing a signal thereto, a second winding on the transformer, means connecting said A.C. circuit to said second winding for furnishing a controlled phase signal to said second winding, rectifier means in the output of said transformer, said transformer and said rectifier means providing an output related to the phase difference between said signals.

4. An apparatus as described in claim 3 wherein a relay having circuit controlling contacts for the motor is disposed in the motor circuit and said relay has a winding, a trigger means connected to and operated by the output from said rectifier means and connected to said relay winding.

5. An apparatus as described in claim 3 wherein said machine includes a feed drive motor and means is connected to the output of said rectifier means and said feed drive motor to vary the speed of the feed drive motor in accordance with the load on the first motor.

6. A torque controlled release for an induction motor comprising a source of A.C. power, an induction motor connected to the source of power means to disconnect the motor circuit when the torque reaches a predetermined value including switch means in the motor circuit, means for deriving signals from the power source and the motor comprising an adjustable phase shift network connected to the source of power and an inductance disposed in series with at least one of said power lines to said motor, said phase shift network being capable of shifting the phase of the signal relative to that of the signal in the inductance, means for combining said signals and converting them to a D.C. output depending upon the difference in phase angle between the two signals, said disconnecting means being connected to and controlled by the output of said converting means.

7. A device as described in claim 6 wherein said signal combining and converting means is a discriminator circuit.

8. A device as described in claim 6 wherein means is provided for compensating for changes in line voltage which cause an apparent change in current phase angle in the motor current circuit comprising rectifier means for the line voltage and means for directing a negative D.C. voltage from said rectifier means into said signal combining means.

9. A device as described in claim 8 wherein means is provided for balancing out the standing part of the line voltage connected to said signal combining means.

References Cited

UNITED STATES PATENTS

| 2,722,648 | 11/1955 | Dunigan | 317—13 |
| 2,992,365 | 7/1961 | Brill | 318—455 |
| 3,131,392 | 4/1964 | Braun | 317—27 |
| 3,202,877 | 8/1965 | Perrault | 317—27 |

ORIS L. RADER, Primary Examiner

K. L. CROSSON, Assistant Examiner

U.S. Cl. X.R.

317—13, 27; 318—314, 335